United States Patent
Lee et al.

(10) Patent No.: US 7,226,701 B2
(45) Date of Patent: *Jun. 5, 2007

(54) POLYMER ELECTROLYTE WITH EFFECTIVE LEAKAGE RESISTANCE AND LITHIUM BATTERY USING THE SAME

(75) Inventors: Kyoung-Hee Lee, Seoul (KR); Ki-Ho Kim, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 492 days.

This patent is subject to a terminal disclaimer.

(21) Appl. No.: 10/461,489

(22) Filed: Jun. 16, 2003

(65) Prior Publication Data
US 2003/0232240 A1    Dec. 18, 2003

(30) Foreign Application Priority Data
Jun. 18, 2002    (KR)    ............... 10-2002-0034130

(51) Int. Cl.
*H01M 10/40*    (2006.01)

(52) U.S. Cl. ............... 429/303; 429/309; 429/317

(58) Field of Classification Search ............... 252/62.2; 429/303, 309, 317
See application file for complete search history.

(56) References Cited

U.S. PATENT DOCUMENTS 6,174,626 B1 *   1/2001   Kojima et al. ............... 429/306
2003/0157411 A1 *  8/2003   Jung et al. ............... 429/317

FOREIGN PATENT DOCUMENTS

JP        2000-311516        11/2000

* cited by examiner

*Primary Examiner*—Gregg Cantelmo
(74) *Attorney, Agent, or Firm*—Stein, McEwen & Bui, LLP

(57) ABSTRACT

A polymer electrolyte has improved leakage resistance and a lithium battery uses the polymer electrolyte. The polymer electrolyte includes a polymerization product of a polymer electrolyte forming composition that includes a multi-functional acrylate based compound, at least one selected from the group consisting of polyalkylene glycol di(meth)acrylates and polyalkylene glycol (meth)acrylates, and an electrolytic solution containing a lithium salt and an organic solvent.

12 Claims, 1 Drawing Sheet

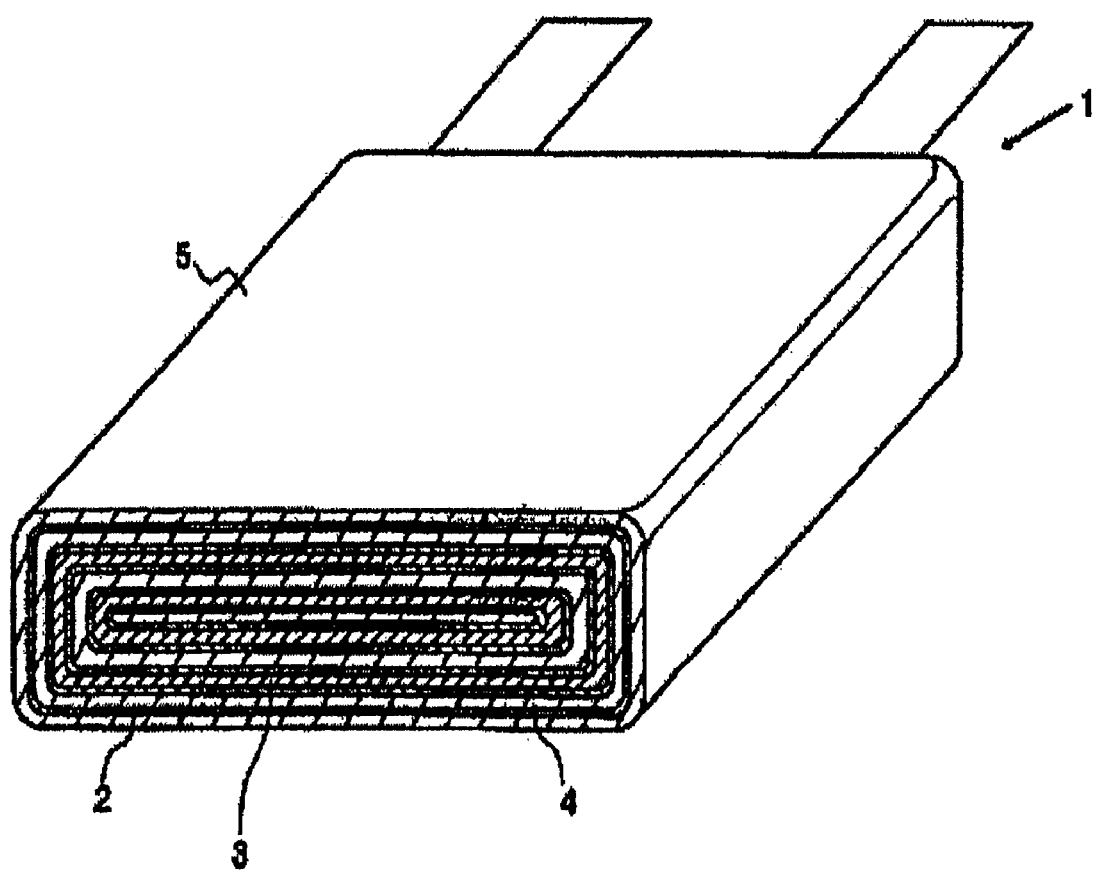

POLYMER ELECTROLYTE WITH EFFECTIVE LEAKAGE RESISTANCE AND LITHIUM BATTERY USING THE SAME

CROSS-REFERENCE TO RELATED APPLICATIONS

This application claims the benefit of Korean Application No. 2002-34130, filed Jun. 18, 2002, in the Korean Intellectual Property Office, the disclosure of which is incorporated herein by reference.

BACKGROUND OF THE INVENTION

1. Field of the Invention

The present invention relates to a polymer electrolyte and a lithium battery using the same, and more particularly, to a polymer electrolyte having effective leakage resistance, and a lithium battery using the polymer electrolyte.

2. Description of the Related Art

Lithium secondary batteries using liquid electrolytic solutions use an organic solvent having a low boiling point to enhance low-temperature performance. However, the use of a low-boiling point organic solvent may give rise to swelling of an electrode assembly or the case of a pouch battery that is allowed to stand at high temperature, resulting in deterioration of reliability and safety of the battery under a high temperature condition.

To overcome these problems, a method of using solid polymer electrolytes has been proposed. Using solid polymer electrolytes reduces the danger of leakage of an electrolytic solution, thus increasing improved safety of a battery, unlike in the case of using liquid electrolytes.

However, using solid polymer electrolytic solutions decreases ionic conductivity compared to the case of using liquid electrolytes. Thus, in order to practically use solid polymer electrolytes in lithium secondary batteries, research must focus on solid polymer electrolytes having high ionic conductivity and effective electrochemical stability.

Linear polymers or crosslinkable polymers of homopolymers or copolymers basically having ethylene oxide are generally used as monomers of ionically conductive polymers for forming the solid polymer electrolytes.

However, the polymers formed from such monomers are susceptible to crystallization, so that the characteristics at low temperature are less effective. Also, since ethylene oxide has a strong affinity to an electrolytic solution, the polymers may move with the electrolytic solution by interaction between the electrolytic solution and the polymer chains decreasing the mobility of lithium ions.

To overcome the above-described problem, a multi-functional acrylate base compound is used in the manufacture of a polymer electrolyte.

However, such a multi-functional acrylate based compound has low polarity so that it exhibits low compatibility with a liquid electrolytic solution, forming a non-homogenous gel. Low compatibility between a monomer and an electrolytic solution reduces leakage resistance. A lithium battery using the polymer electrolyte with low leakage resistance has considerably reduced reliability.

SUMMARY OF THE INVENTION

Additional aspects and advantages of the invention will be set forth in part in the description which follows and, in part, will be obvious from the description, or may be learned by practice of the invention.

The present invention provides a polymer electrolyte with effective leakage resistance and a manufacturing method thereof.

Also, the present invention provides a lithium battery with improved reliability by using the polymer electrolyte.

In an aspect of the present invention, a polymer electrolyte comprises a polymerized product of a polymer electrolyte forming composition comprising: polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, or its polymer; at least one selected from polyalkylene glycol di(meth)acrylates represented by Formula 1 and polyalkylene glycol (meth)acrylates represented by Formula 2; and an electrolytic solution having a lithium salt and an organic solvent:

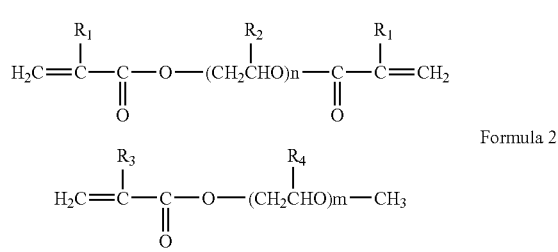

wherein $R_1$, $R_2$, $R_3$ and $R_4$ are independently H or $CH_3$, and n and m are independently an integer from 1 to 100,000.

In accordance with another aspect of the present invention, a method of preparing the polymer electrolyte comprises obtaining a polymer electrolyte forming composition by mixing polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, or its polymer, at least one selected from polyalkylene glycol di(meth)acrylates represented by Formula 1 and polyalkylene glycol (meth)acrylates represented by Formula 2, and an electrolytic solution having a lithium salt and an organic solvent:

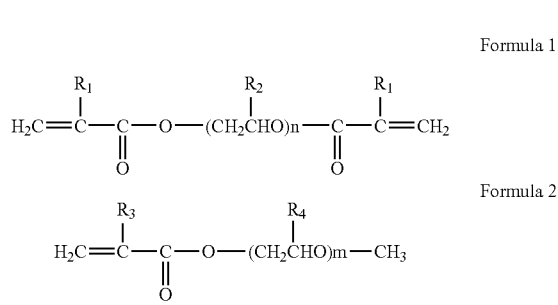

wherein $R_1$, $R_2$, $R_3$ and $R_4$ are independently H or $CH_3$, and n and m are independently an integer from 1 to 100,000; and casting the polymer electrolyte forming composition and polymerizing by heat or light.

In accordance with another aspect of the present invention, a lithium battery comprises a cathode, an anode, and the polymer electrolyte interposed between the cathode and the anode.

The lithium battery may further comprise a separator made of an insulating resin between the cathode and the anode.

Alternatively, a method of preparing a lithium battery comprises obtaining a polymer electrolyte forming composition by mixing polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, or its polymer, at least one selected from polyalkylene glycol di(meth)acrylate and polyakylene glycol (meth)acrylates represented by Formula 2, and an electrolytic solution having a lithium salt and an organic solvent; inserting a separator made of an insulating resin having a network structure between a cathode and an anode to form an electrode assembly and encasing the electrode assembly; and forming the polymer electrolyte by injecting the polymer electrolyte forming composition into the resulting product and polymerizing by heat or light:

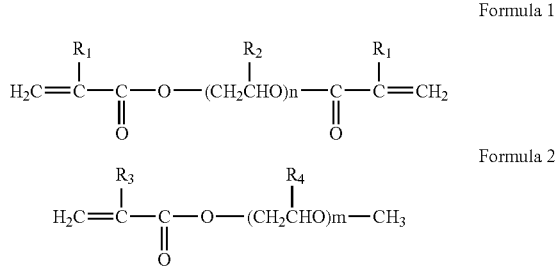

wherein $R_1$, $R_2$, $R_3$ and $R_4$ are independently H or $CH_3$, and n and m are independently an integer from 1 to 100,000.

BRIEF DESCRIPTION OF THE DRAWING

These and/or other aspects and advantages of the invention will become apparent and more readily appreciated from the following description of the embodiments, taken in conjunction with the accompanying drawing of which:

FIG. 1 is a perspective view of a battery according to an embodiment of the present invention.

DETAILED DESCRIPTION OF THE EMBODIMENTS

Reference will now be made in detail to an embodiment of the present invention, an example of which is illustrated in the accompanying drawing. The embodiment is described below in order to explain the present invention by referring to the figure.

The present invention relates to a polymer electrolyte having improved leakage resistance obtained by adding polyalkylene glycol di(meth)acrylates represented by Formula 1 or polyalkylene glycol (meth)acrylates represented by Formula 2 to a multi-functional acrylate based compound and polymerizing:

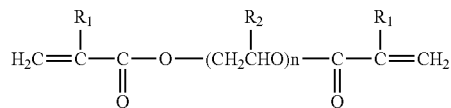

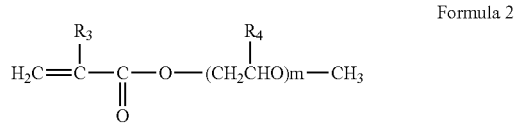

wherein $R_1$, $R_2$, $R_3$ and $R_4$ are independently H or $CH_3$, and n and m are independently an integer from 1 to 100,000.

As the multi-functional acrylate compound, a polymer electrolyte comprising polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, or its polymer is used.

The polyalkylene glycol di(meth)acrylates represented by Formula 1 and polyalkylene glycol (meth)acrylates represented by Formula 2 have a large polarity and effective compatibility with a liquid electrolytic solution.

If polyester (meth)acrylate modified from polyester polyol having not greater than two hydroxide groups is used as a monomer for forming a gel-type polymer electrolyte, a physically dense, viscous electrolyte is formed, lowering the mobility of lithium ions, which adversely affect a high-rate characteristic and a lifetime characteristic of a battery. If a compound with all of the hydroxide groups of polyester polyol being substituted by (meth)acrylic ester is used as a monomer for forming a gel-type polymer electrolyte, gelation is impeded by steric hindrance, so that unreacted (meth)acrylic acid or its derivative remains in a final polymer electrolyte. Here, the (meth)acrylatic acid or its derivative is used to convert the hydroxide groups of polyester polyol into (meth)acrylic ester. Since the unreacted (meth)acrylic acid or its derivative remaining in the polymer electrolyte are highly reactive, such compounds may cause deterioration of low-temperature, high-rate discharging and lifetime characteristics of a lithium battery.

In the present invention, some hydroxide groups of polyester polyol having three or more hydroxide groups are substituted by (meth)acrylic esters, and unsubstituted hydroxide groups are substituted by a radically non-reactive group to form a polyester (meth)acrylate or its polymer.

The polyester polyols having three or more hydroxide groups useful for preparing polyester (meth)acrylate of the invention may be synthesized by any suitable methods and may also be obtained as a commercially available product. Examples of the polyester polyols having three or more hydroxide groups include, but are not limited to, trialkylols such as trimethylol, triethylol or tripropylol, glycerols, erythritols such as pentaerythritol or dipentaerythritol, and the like.

Some or all hydroxide groups of polyester polyol may be substituted by (meth)acrylic ester by general esterification. For example, polyester polyol and (meth)acrylic acid or its derivative (e.g., halogenated (meth)acrylic acid) (abbreviated as "MA") may be condensation-polymerized in the presence of a base catalyst or an acid catalyst.

In the above-noted methods, the content of MA is varied according to the mole number of the hydroxy group of the polyester polyol. According to an embodiment of the present invention, 0.1 to 10 moles MA is preferably used based on 1 mol of the hydroxy group of the polyester polyol. More preferably, approximately 1 mol MA is used with respect to 1 mol of the hydroxy group of the polyester polyol.

The performance of a polymer electrolyte may be desirably improved by adjusting the terminal functional groups of compounds for forming the polymer electrolyte. The performance of a polymer electrolyte may be determined by a molar ratio of MA used when it reacts with polyester polyol to substitute a polyester polyol terminal by (meth)acrylic ester, to a compound (to be abbreviated as "RX") used when it reacts with polyester polyol to a polyester polyol terminal by a radically non-reactive group. The compound is exemplified by a carbonyl compound comprising an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms, or a halogenated compound containing an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms. The molar ratio of MA to RX is preferably in the range of 1:0.01 to 1:100, more preferably 1:0.5 to 1:3. If the RX content is less than the above range, all terminals of polyester polyol are undesirably substituted by (meth)acrylic ester groups. If the content of RX exceeds the above range, reacting (meth)acrylic ester groups are too small to form a desired polymer electrolyte.

Usable basic catalysts for use in esterification of polyester polyol according to the present invention include organic salts such as triethylamine, pyridine or dimethylaminepyridine, and inorganic salts such as lithium carbonate, potassium carbonate, lithium hydroxide or sodium hydroxide. Here, the basic catalyst is preferably used in an amount of 0.0001 to 0.01 parts by weight based on 1 part by weight of the overall reaction solvent. Usable examples of the acid catalyst used in esterification of polyester polyol according to the present invention include sulfuric acid, hydrochloric acid and phosphoric acid, and the amount used is the same as that of the basic catalyst.

The molecular structure of polyester polyol used in esterification may be modified by open-ring polymerization with a lactone compound. The modified structure of the polyester polyol polymerized with a lactone compound may adjust the length of the alkyl group with a hydroxy group functioning as a reacting group in the molecular backbone, thus effectively changing the physical properties of a polymer electrolyte.

Examples of the lactone compound include ε-caprolactone and γ-caprolactone, and may be used in any molar ratio with respect to the mole number of hydroxy groups of polyester polyol. However, in view of the solubility and molecule size of lactone substituted polyester polyol, the lactone compound is preferably used in an amount less than or equal to 10 mol, specifically 0.01 to 10 moles, based on 1 mol of the hydroxide group of the polyester polyol.

Usable catalysts for promoting the ring-opening polymerization include organic titan compounds, organic tin compounds and organic carboxylic acid metal salts of various metals. An example of the organic titan compounds is tetrapropyl titanate.

The catalyst is preferably in an amount of 0.001 to 0.5 parts by weight based on 1 part by weight of the lactone compound. If the content of the catalyst is not in the above range, the deviation undesirably gives rise to ineffective reactivity of ring opening polymerization.

The ring-opening polymerization may be carried out in the absence or presence of an organic solvent. Usable organic solvents include aromatic compounds and saturated hydrocarbon compounds. The organic solvent is used in an amount of 1 to 50 parts by weight, preferably 2 to 10 parts by weight, based on 1 part by weight of polyester polyol.

The (meth)acrylic ester substituted to the polyester polyol is particularly represented by the general formula —OC(=O)$R_n$OC(=O)CH=CH$_2$ or —OC(=O)$R_n$OC(=O)C(CH$_3$)=CH$_2$ or —OC(=O)$R_n$CH=CH$_2$ (where n is an integer in the range of 1 to 20).

Examples of the group free of radical reactivity include an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms, preferably the radically non-reactive group is represented by the general formula —OC(=O)R'$_n$, —OC(=O)R$_m$OR'$_n$, —O(C=O)R$_m$OC(=O)R'$_n$ (Here, m and n are independent integers in the range 1 to 20, R is a (halogenated) alkylene group, a (halogenated) arylene group, a (halogenated) alkylarylene group or a (halogenated) aralkylene group, and R' is a (halogenated) alkyl group, a (halogenated) aryl group, a (halogenated) alkylaryl group or a (halogenated) aralkyl group.

The molar ratio of the (meth)acrylic ester group to the group free of radical reactivity is preferably 1:0.01 to 1:100, more preferably 1:0.5 to 1:3.

The substituted polyester (meth)acrylic ester group or its polymer preferably has a weight-average molecular weight of about 300 to 100,000.

In the Formula 1, the polyalkylene glycol di(meth)acrylate is preferably polyethylene glycol di(meth)acrylate or polypropylene glycol di(meth)acrylate. In the Formula 2, the polyalkylene glycol (meth)acrylate is preferably polyethylene glycol (meth)acrylate or polypropylene glycol (meth)acrylate.

A method of preparing a polymer electrolyte according to the present invention is now described.

The polymer electrolyte includes a polymer matrix and an electrolytic solution contained therein.

The material for forming the polymer matrix is a mixture of polyester (meth)acrylate having a polyester polyol moiety having three or more hydroxide (—OH) groups, at least one hydroxide group being substituted by a (meth)acrylic ester group and at least one hydroxide group being substituted by a radical non-reactive group, or its polymer, and at least one selected from polyalkylene glycol di(meth)acrylates represented by Formula 1 and polyalkylene glycol (meth)acrylates represented by Formula 2. When the material for forming the polymer matrix is mixed with the electrolytic solution including a lithium salt and an organic solvent, a polymer electrolyte forming composition may be obtained.

In the polymer electrolyte forming composition, the mixture ratio by weight of the polymer matrix forming material to the electrolytic solution is preferably 1:0.1 to 1:50. If the content of the polymer matrix forming material relative to the content of the electrolytic solution exceeds the above range, the excess gives rise to the disadvantages that the mechanical property of a polymer electrolyte film deteriorates, and the ionic conductivity characteristic thereof decreases. If the content of the polymer matrix forming material relative to the content of the electrolytic solution is less than the above range, the shortage entails the disadvantage that the reactivities of precursors for forming the polymer electrolyte film are lowered, making it difficult to obtain a polymer electrolyte film.

In the material for forming a polymer matrix, the mixture ratio by weight of the multi-functional acrylate based compound to at least one selected from the group consisting of polyalkylene glycol di(meth)acrylate represented by Formula 1 and polyalkylene glycol (meth)acrylate represented by Formula 2 is in the range of 1:0.0001 to 0.0001:1, preferably 1:0.01 to 0.01:1.

If the proportion of the content of the multi-functional acrylate based compound to the total content of at least one selected from the group consisting of polyalkylene glycol di(meth)acrylate represented by Formula 1 and polyalkylene glycol (meth)acrylate represented by Formula 2 exceeds the above range, the excess gives rise to the disadvantage that the mechanical property of a polymer electrolyte film deteriorates, and if less than the above range, the shortage entails the disadvantage that the reactivities of precursors for forming the polymer electrolyte film are lowered, making it difficult to obtain the polymer electrolyte film.

Also, the polyalkylene glycol di(meth)acrylate represented by Formula 1 has a weight-average molecular weight of 170 to 4,400,000, more preferably 200 to 100,000. If the weight-average molecular weight of the polyalkylene glycol di(meth)acrylate exceeds the above range, the mechanical property of a film formed by polymerization of the polyalkylene glycol di(meth)acrylate becomes undesirably weak.

A polymerization initiator and a polymerization catalyst may be further added to the composition for forming the polymer electrolyte, if necessary, and mixed to obtain a homogenized solution. Here, the polymerization catalyst is added for improving the polymerizing speed, and usable examples thereof include one or more amines selected from the group consisting of triethylamine, tributylamine, triethanolamine, and N-benzyldimethylamine. The content of the polymerization catalyst added is preferably in the range of 0.01 to 2.0 parts by weight, based on 100 parts by weight of the polymer matrix forming material. If the content of the polymerization catalyst is greater than 2.0 parts by weight, the electrochemical property of the polymer electrolyte deteriorates. If the content of the polymerization catalyst is less than 0.01 parts by weight, the polymerization is not carried out effectively, which is undesirable.

The polymerization initiator is at least one selected from the group consisting of diacyl peroxides exemplified by dibenzoyl peroxide, succinic acid peroxide, dilauroyl peroxide, didecanoyl peroxide and m-toluoyl peroxide; dialkyl peroxides exemplified by dicumyl peroxide, di-t-butyl peroxide, 2,5-dimethyl-2,5-di-(t-butylperoxy)hexane, isobutyl peroxide and 3,3,5-trimethylhexanoyl peroxide; peroxy esters exemplified by α-cumyl peroxyneodecanoate, 1,1-dimethyl-3-hydroxybutylperoxy-2-ethyl hexanoate, t-amyl peroxybenzoate, t-butyl peroxypivalate, t-butyl peroxy-2-ethyl hexanoate, and t-butyloxy neodecanate; tertiary alkyl hydroperoxides exemplified by 2,5-dihydro peroxy-2,5-dimethylhexane, cumene hydroperoxide and t-butyl hydroperoxide; peroxy ketals exemplified by 1,1-di-(t-amylperoxy)-cyclohexane, 2,2-di-(t-butylperoxy)butane and ethyl 3,3-di-(t-butylperoxy)butylate; peroxydicarbonates exemplified by di(n-propyl) peroxydicarbonate, di(sec-butyl) peroxydicarbonate, di(2-ethyl hexyl) peroxydicarbonate, diisopropyl peroxydicarbonate, diethoxy peroxydicarbonate, bis-(4-t-butylcyclohexyl) peroxydicarbonate, dimethoxyisopropyl peroxydicarbonate and dicyclohexyl peroxy dicarbonate; and azos exemplified by azobisisobutyronitrile. The content of the polymerization initiator is preferably in the range of 0.0001 to 10 parts by weight per 100 parts by weight of the polymer matrix forming material.

In particular, dialkyl peroxides, peroxy esters, peroxy ketals or peroxy dicarbonates, are more preferably used as the polymerization initiator because the use of a gas forming compound such as azobisisobutyronitrile, may cause the surface of a polymer electrolyte formed on an electrode plate to be roughened due to the generated gas.

Then, the resultant mixture is cast on a support substrate and polymerized by heat or UV ray for curing. As the support substrate, a glass substrate or a Teflon substrate is used. The polymerizing temperature is preferably in the range of 25 to 85° C., more preferably 60 to 80° C. If the polymerizing temperature is higher than 85° C., volatilization of the liquid electrolyte or decomposition of a lithium salt may result. If the polymerizing temperature is lower than 25° C., the polymerization may not take place properly.

UV light, e-beam or γ-rays may be used as the light source.

If the curing is completed through the polymerization, the support substrate is subjected to stripping, thus obtaining a polymer electrolyte according to the present invention.

In the manufacturing method of the polymer electrolyte, any organic solvent that is generally used in the manufacture of a lithium battery, may be used. Examples of the organic solvent include at least one selected from the group consisting of propylene carbonate, ethylene carbonate, dimethylcarbonate, diethylcarbonate, methylethylcarbonate, tetrahydrofuran, 2-methylhydrofuran, diethoxyethane, methylformate, ethylformate and γ-butyrolactone. The content of the organic solvent is in the range of 90 to 99.9 parts by weight, based on 100 parts by weight of the electrolytic solution.

Usable examples of the lithium salt forming the electrolytic solution include at least one selected from the group consisting of $LiClO_4$, $LiBF_4$, $LiPF_6$, $LiCF_3SO_3$, and $LiN(CF_3SO_2)_2$, and the content of the lithium salt is in the range of 0.1 to 10 parts by weight, based on 100 parts by weight of the electrolytic solution.

To improve the mechanical strength and the performance at the interface with electrodes, additives such as an adhesion enhancer, a filler or the like may be further added to the polymer electrolyte forming composition.

Now, a method of preparing a lithium battery using the polymer electrolyte according to the present invention is described.

First, a cathode and an anode are manufactured by the same method generally used in manufacturing a lithium battery. Here, a lithium metal composite oxide, a transition metal compound or a sulfur compound may be used as a cathode active material, and a lithium metal, a carbonaceous material or graphite may be used as an anode active material.

Then, the thus-prepared polymer electrolyte is interposed between the cathode and the anode, followed by winding or stacking, to form an electrode assembly, and the resultant structure is put into a battery case, thus assembling a battery.

Then, an electrolytic solution comprising an organic solvent and a lithium salt is injected into the battery case, thus completing a lithium battery.

Another method of preparing a lithium battery according to the present invention is described.

As in the above-described preparation method, a composition for forming a polymer electrolyte is first prepared.

Separately, a cathode and an anode are prepared, respectively, in the same manner as described above.

Then, a separator made from an insulating resin having a network structure is interposed between the cathode and the anode, followed by winding or stacking, to form an electrode assembly, and the resultant structure is put into a battery case, thus assembling a battery. Here, the separator is a single-layered polyethylene or polypropylene separator, a double-layered separator of polyethylene/polypropylene, or a triple-layered separator of polyethylene/polypropylene/polyethylene or polypropylene/polyethylene/polypropylene.

Then, the polymer electrolyte forming composition is injected into a battery case accommodating the electrode assembly, and thermally treated to perform a polymerization reaction in the battery, thus completing a lithium battery according to the present invention.

In the above-described preparation method, the thermal treatment temperature is preferably in the range of 25 to 85° C., more preferably 60 to 80° C. The deviation of the thermal treatment temperature from the above range entails the same disadvantage as above. In the case of light irradiation for polymerization, ultraviolet (UV) light may be used.

According to the above-described preparation method, a polymer formed by polymerization of unsaturated groups present in the multi-functional acrylate based compound represented by formula 1, polyalkylene glycol di(meth) acrylate represented by formula 2 and/or and polyalkylene glycol (meth)acrylate represented by formula 3, is completely dissolved in the electrolytic solution and gelled at room temperature. In such a manner, a gel-type polymer electrolyte is formed on an insulative resin sheet, and solid polymer electrolyte existing in the network structure of the insulative resin sheet is completed.

The thickness of the polymer electrolyte coated on the insulative resin sheet having a network structure is preferably in the range of 5 to 90 µm. The polymer electrolyte has effective ionic conductivity within the 5 to 9 µm range of thickness.

The lithium battery according to the present invention is not specifically limited from the viewpoint of type or shape, and the present invention may be applied to both lithium primary batteries and lithium secondary batteries.

The present invention is now described through the following examples and is not limited thereto.

SYNTHESIS EXAMPLE 1

To a mixture of 1 mol of dipentaerythritol, 2 mol of ε-caprolactone and a toluene solvent was added 100 mg of a tetrapropyltitanate catalyst to be reacted at 50° C., thus synthesizing a monomer of a dipentaerythritol derivative having some terminal hydroxy groups substituted by pentylalcohol.

Then, 1 mol of the pentaerythritol derivative, 4 mol of acrylic acid and 2 mol of butylcarboxylic acid were reacted to obtain a polyester hexaacrylate compound having two hydroxy groups present at the terminals of the pentaerythritol derivative substituted by $-OC(=O)(CH_2)_5OC(=O)CH=CH_2$ and the remaining four hydroxy groups substituted by $-OC(=O)(CH_2)_3CH_3$.

EXAMPLE 1

0.9 g of the multi-functional acryl based compound prepared in Synthesis Example 1, 0.1 g of polyethylene glycol dimethacrylate having a weight average molecular weight of 550 were mixed with 0.01 g dilauroyl peroxide and 30 g of 1.3 mol/L $LiPF_6$ electrolytic solution having a EC, DEC, PC, and FB mixed in a weight ratio of 30:55:5:10 to prepare a polymer electrolyte forming composition.

The polymer electrolyte forming composition was cast on a support substrate and then polymerized at 75° C. for 4 hours to prepare a polymer electrolyte.

EXAMPLE 2

A polymer electrolyte was prepared in the same manner as in Example 1 except that polyethylene glycol methacrylate was used instead of polyethylene glycol dimethacrylate, in the preparation of the polymer electrolyte forming composition.

EXAMPLE 3

94 g of $LiCoO_2$, 3 g of Super P conductive carbon, 3 g of polyvinylidenefluoride (PVDF) were dissolved in N-methylpyrrolidone (NMP) to produce a cathode active material slurry. Then, an aluminum (Al) foil having a width of 4.9 cm and a thickness of 147 µm was coated with the cathode active material slurry, dried, rolled and cut into a predetermined size to prepare a cathode.

89.8 g of mezocarbon fiber (MCF available from PETCOA, LTD.), 0.2 g of oxalic acid and 10 g of PVDF were dissolved in NMP to produce an anode active material slurry. Then, a copper (Cu) foil having a width of 5.1 cm and a thickness of 178 µm was coated with the anode active material slurry, dried, rolled and cut into a predetermined size to prepare an anode.

A separator was interposed between the cathode and the anode. The resultant structure was accommodated in a battery case, and then the polymeric electrolyte composition obtained in Example 1 was injected into the battery case under reduced pressure.

Then, the resultant product was polymerized at 80° C. for 2 hours, thus completing a lithium polymer battery. Here, a 1.3 M $LiPF_6$ electrolytic solution having EC and DEC mixed in a weight ratio of 3:7 was used as the electrolytic solution.

EXAMPLE 4

A lithium secondary battery was prepared in the same manner as in Example 3, except that instead of the polymer electrolyte forming composition prepared in Example 1, the polymer electrolyte forming composition prepared in Example 2 was used.

Comparative Example 1

A polymer electrolyte was prepared in the same manner as in Example 1, except that instead of 0.9 g of the multi-functional acryl based compound and 0.1 g of polyethylene glycol dimethacrylate, 1 g of the multi-functional acrylate based compound prepared in Synthesis Example 1 was used in preparation of a polymer electrolyte forming composition.

Comparative Example 2

A lithium secondary battery was prepared in the same manner as in Example 3, except that instead of the polymer electrolyte forming composition prepared in Example 1, the polymer electrolyte forming composition prepared in Comparative Example 1 was used.

In the polymer electrolytes according to Examples 1–2 and Comparative Example 1, external appearances thereof were observed.

As a result, it is confirmed that the polymer electrolyte prepared in Comparative Example 1 experiences phase separation between the polymer matrix and the electrolytic solution, forming an heterogeneous gel while the polymer electrolytes prepared in Examples 1–2 yield transparent, homogenous gels because compatibility between the electrolytic solution and the polymer matrix formed is increased by adding polyethylene glycol di(meth)acrylate having polar groups to the multi-functional acrylate based compound.

In the lithium polymer batteries prepared in Examples 3–4 and Comparative Example 2, evaluation of leakage resistance was carried out. The leakage resistance was evaluated by observing changes in the weight of each battery before and after pressing the battery with a force of approximately 40 kgf/cm² and determining whether electrolytic solutions were leaked.

The evaluation results of leakage resistance are shown in Table 1.

TABLE 1

|  | Weight (g) before pressed | Weight (g) after pressed | Change in weight (mg) | Leak |
|---|---|---|---|---|
| Comparative Example 2 | 17.2665 | 17.2035 | 63 | O |
| Example 3 | 17.2537 | 17.2512 | 2.5 | X |
| Example 4 | 17.2587 | 17.2568 | 1.9 | X |

It was confirmed from Table 1 that the lithium secondary batteries prepared in Examples 3 and 4 experienced little change in weight even if pressed and no leakage occurred.

On the other hand, the lithium secondary battery prepared in Comparative Example 2 was considerably changed in the weight, and leakage occurred thereto, compared to the batteries prepared in Examples 3 and 4.

The polymer electrolyte according to the present invention increases compatibility between a liquid electrolytic solution and a polymer matrix by adding polyalkylene di(meth)acrylate or polyalkylene glycol (meth)acrylate, which is a monomer having effective compatibility with a liquid electrolytic solution, thus overcoming the problem of leakage due to low compatibility between a multi-functional acrylate based compound and a liquid electrolytic solution. Therefore, a lithium polymer battery using the polymer electrolyte has greatly improved leakage resistance, thus attaining reliability against an electrolyte leakage problem, which is often encountered with pouch batteries.

As shown in FIG. 1, a lithium secondary battery 1 according to an embodiment of the present invention includes a case 5 containing an anode 2, a cathode 3, and a separator 4 interposed between the anode 2 and the cathode 3. The polymer electrolyte (not shown) of the present invention is disposed between the positive and negative electrodes 2 and 4.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte comprising a polymerized product of a polymer electrolyte forming composition comprising:
   polyester (meth)acrylate having a polyester polyol moiety having three or more hydroxide (—OH) groups, at least one hydroxide group being substituted by a (meth) acrylic ester group and at least one hydroxide group being substituted by a radical non-reactive group, or its polymer; and
   a polyalkylene glycol di(meth)acrylates represented by Formula 1 and an electrolytic solution having a lithium salt and an organic solvent:

Formula 1

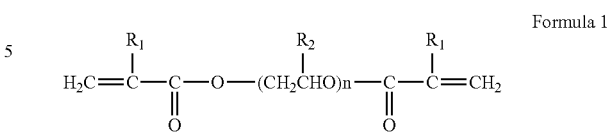

wherein $R_1$, $R_2$, are independently H or $CH_3$, and n and m are independently an integer from 1 to 100,000.

2. The polymer electrolyte of claim 1, wherein the radical non-reactive group is a $C_1$–$C_{20}$ aliphatic hydrocarbon group.

3. The polymer electrolyte of claim 1, wherein the (meth) acrylic ester is one of —OC(=O)$R_n$, OC(=O)CH=$CH_2$, where n is an integer from 1 to 20; the radical non-reactive group is —OC(=O)R'$_m$, where m and n are independently an integer from 1 to 20, R is selected from a group consisting of a (halogenated) alkylene group, a (halogenated) arylene group, a (halogenated) alkylarylene group or a (halogenated) aralkylene group, R' is selected from a group consisting of a (halogenated) alkyl group, a (halogenated) aryl group, a (halogenated) alkylaryl group and a (halogenated) aralkyl group.

4. The polymer electrolyte of claim 1, wherein a molar ratio of the (meth)acrylic ester to the radical non-reactive group ranges from about 1:0.01 to about 1:100.

5. The polymer electrolyte of claim 1, wherein a mixture ratio by weight of the poly(ester) (meth)acrylate or its polymer to the polyalkylene glycol di(meth)acrylate represented by Formula 1 is in the range of 1:0.0001 to 0.0001:1.

6. The polymer electrolyte of claim 1, wherein a mixing ratio by weight of a mixture of the poly(ester) (meth)acrylate or its polymer and the polyalkylene glycol di(meth)acrylate represented by Formula 1 to the electrolytic solution is in the range of 1:0.1 to 1:50.

7. The polymer electrolyte of claim 1, wherein the polymer electrolyte forming composition further comprises at least one selected from a polymerization initiator and polymerization catalyst.

8. The polymer electrolyte of claim 7, wherein the polymerization initiator is at least one selected from the group consisting of dibenzoyl peroxide, succinic peroxide, dilauroyl peroxide, didecanoyl peroxide, m-toluoyl peroxide, dicumyl peroxide, di-t-butyl peroxide, 2,5-dimethyl-2,5-di-(t-butylperoxy)hexane, isobutyl peroxide, 3,3,5-trimethylhexanoyl peroxide, α-cumyl peroxyneodecanoate, 1-1-dimethyl-3-hydroxybutylperoxy-2-ethyl hexanoate, t-amyl peroxybenzoate, t-butyl peroxypivalate, t-butyl peroxy-2-ethyl hexanoate, 2,5-dihydro peroxy-2,5-dimethylhexane, cumene hydroperoxide, t-butyl hydroperoxide, 1,1-di-(t-amylperoxy)-cyclohexane, 2,2-di-(t-butylperoxy)butane, ethyl 3,3-di-(t-butylperoxy)butylate, di(n-propyl) peroxydicarbonate, di(sec-butyl) peroxydicarbonate, di(2-ethyl hexyl) peroxydicarbonate, t-butyloxy neodecanate, diisopropyl peroxydicarbonate, diethoxy peroxydicarbonate, bis-(4-t-butylcyclohexyl) peroxydicarbonate, dimethoxyisopropyl peroxydicarbonate, dicyclohexyl peroxy dicarbonate, azobisisobutyronitrile, and the content thereof ranges from 0.0001 to 10 parts by weight per 100 parts by weight of a mixture of at least one selected from the group consisting of poly(ester) (meth)acrylate or its polymer, polyalkylene glycol di(meth)acrylate represented by Formula 1 .

9. The polymer electrolyte of claim 1, wherein the polymerization catalyst is at least one selected from the group consisting of triethylamine, tributylamine, triethanolamine and N-benzyldimethylamine, and the content thereof ranges from 0.01 to 2 parts by weight per 100 parts by weight of a mixture of at least one selected from the group consisting of poly(ester) (meth)acrylate or its polymer, polyalkylene glycol di(meth)acrylate represented by Formula 1.

10. The polymer electrolyte of claim 1, wherein a weight average molecular weight of polyalkylene glycol di(meth)acrylate represented by Formula 1 ranges from 170 to 4,400,000.

11. The polymer electrolyte of claim 1, wherein the lithium salt is at least one selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonylamide ($LiN(CF_3SO_2)_2$), and the content thereof ranges from 0.1 to 10 parts by weight per 100 parts by weight of the electrolytic solution.

12. The polymer electrolyte of claim 1, wherein the organic solvent is at least one selected from the group consisting of propylene carbonate, ethylene carbonate, dimethyl carbonate, methylethyl carbonate, diethyl carbonate, tetrahydrofuran, 2-methylhydrofuran, diethoxyethane, methylformate, ethylformate and γ-butyrolactone, and the content thereof ranges from 90 to 99.9 parts by weight per 100 parts by weight of the electrolytic solution.

* * * * *

UNITED STATES PATENT AND TRADEMARK OFFICE
CERTIFICATE OF CORRECTION

PATENT NO. : 7,226,701 B2  Page 1 of 1
APPLICATION NO. : 10/461489
DATED : June 5, 2007
INVENTOR(S) : Kyoung-Hee Lee et al.

It is certified that error appears in the above-identified patent and that said Letters Patent is hereby corrected as shown below:

Column 12, line 13
change "$C_{1\text{-}C20}$" to --$C_1$-$C_{20}$--

Column 12, line 15
delete "one of"

Column 12, line 64
change "claim 1" to --claim 7--

Signed and Sealed this

Sixteenth Day of October, 2007

JON W. DUDAS
*Director of the United States Patent and Trademark Office*